United States Patent Office 3,222,283

Patented Dec. 7, 1965

3,222,283

LEAD BARIUM NIOBATE CERAMIC COMPOSITION

Alexis V. Illyn, Phoenix, Gerald G. Palmer, Liverpool, and Vladimir L. Popoff, Syracuse, N.Y., assignors to General Electric Company, a corporation of New York No Drawing. Filed Apr. 2, 1962, Ser. No. 184,558
6 Claims. (Cl. 252—62.9)

The present invention relates to polycrystalline ferroelectric ceramic materials and in particular to improved lead barium niobate ceramic compositions having certain desirable electrical properties. The invention is principally directed to novel and improved lead barium niobate ceramic compositions exhibiting an improved electro-mechanical Q, making such compositions particularly suitable for filter applications in electrical circuits.

The compositions of the present invention constitute an improvement over the lead barium niobate compositions disclosed in U.S. Letters Patent No. 2,805,165, entitled "Ceramic Composition," issued September 3, 1957, to Gilbert Goodman, and in British Patent No. 881,476, entitled "Improvements in or Relating to Ceramic Dielectric Materials," published November 1, 1961; inventors, M. H. Francombe and B. Lewis. The Goodman patent discloses polycrystalline ceramic compositions of the generalized formula $(Pb_{1-x}.A_x)(NBO_3)_2$, where A represents an element selected from the group consisting of barium, calcium, magnesium and strontium or mixtures thereof and where $x$ varies from .001 to .85. The addition of element A in the proportions set forth has been found to provide compositions exhibiting a number of useful and improved properties. In particular it has been found that the Curie temperature, which is 570° C. for a lead metaniobate composition $Pb(NbO_3)_2$, is lowered as the content of element A is increased. The material can then be more completely polarized to exhibit higher remanent piezoelectric properties than previously possible, since the material is more responsive to the activating electric field at the lower Curie temperatures. The material still possesses much of the advantage of a high Curie temperature associated with $Pb(NbO_3)_2$. In addition, the dielectric constant of the material is relatively high, and its electrical properties in general have good temperature stability.

The above noted British patent is directed to a process for manufacturing a lead barium niobate of the above formula, wherein the element A is solely barium, which provides a material exhibiting certain improved electrical properties including higher values of the electro-mechanical Q. The electro-mechanical Q may be defined as the ratio of the inductive reactance to the resistance of the equivalent electrical circuit of the piezoelectrically activated ceramic body at resonance. It is an important property of ferroelectric ceramic materials for filter applications in providing a narrow band frequency response characteristic.

The compositions of the present invention retain many of the desirable properties of the prior art compositions and in addition exhibit a highly improved electro-mechanical Q property.

Accordingly one object of the invention is to provide a ferroelectric ceramic material exhibiting an improved electro-mechanical Q property.

A further object of the invention is to provide a ferroelectric ceramic material having an improved electro-mechanical Q property and good dielectric, piezoelectric and energy coupling characteristics, said material thereby being useful for filter applications in an electrical circuit.

Another object of the present invention is to provide a lead barium niobate ceramic composition exhibiting an improved electro-mechanical Q and an improved dielectric constant, and having good piezoelectric and energy coupling characteristics which make the material useful for wide range, band-pass filter applications in electrical circuits.

These and other objects of the invention are accomplished by providing a lead barium niobate composition of the formula $[(PbO)_{1-x}(BaO)_x]_{1-y}[Nb_2O_5]_y$ where $y$ may vary from a value slightly in excess of .5 to somewhat greater than .625 and where $x$ may vary over an approximate range of from .1 to .7. The greater than 50 mol percent niobium pentoxide ($Nb_2O_5$) content in the above composition has been found to provide an unexpected improvement in the electro-mechanical Q property of the composition and to provide values of Q appreciably higher than obtained with known compositions in this family. The dielectric constant is also increased.

A ferroelectric material may be defined as one having a spontaneous formation of dipoles which can be oriented by the application of a polarizing electric field within the breakdown strength of the material. The dipole formation may be considered as arising from a displacement between the effective centers of the positive ions and the effective centers of the negative ions. In the unpolarized state the dipoles will have a random orientation so that the net charge of all dipoles is zero. Polycrystalline ferroelectric ceramic materials are characterized in that a change in the crystalline structure of the material occurs as the material is heated beyond a certain critical temperature, termed the Curie temperature. In the polycrystalline ferroelectric ceramics of the type under consideration, the crystalline structure at temperatures below the Curie temperature is of an orthorhombic configuration and at temperatures above the Curie temperature the crystalline structure is transformed into a tetragonal configuration. In the region of the Curie point the dipoles of the crystalline structure are effectively loosened and upon the application of an external electric field are readily oriented or aligned. If the electric field is maintained while the material is cooled well below the Curie temperature, the dipoles become set in the aligned condition, the material thereby acquiring a piezoelectric property.

The lead barium niobate ferroelectric ceramic compositions of the present invention, having an increased niobium pentoxide ($Nb_2O_5$) content over stoichiometric compounds have been found to exhibit a greatly improved electro-mechanical Q property, and in fact certain of the compositions have a Q value appreciably higher than it has been possible to attain with any comparable ceramic materials, such as described in the aforementioned Goodman and British patents. These materials, capable of being fabricated into dense, vitrified compositions of high mechanical strength having relatively good coupling coefficients and high dielectric and piezoelectric properties of good temperature stability, are well suited for many filter applications. By virtue of the improved Q, good coupling coefficient and high dielectric constant they are extremely useful as band-pass filters which are operable over a wide range of frequencies, which range may extend below 1 kc./sec. to well above 1 mc./sec., and which are operable at relatively high temperatures. The compositions of extremely high Q are well suited for very narrow band-pass requirements. They are superior in many respects to quartz filter materials which, although having very high Q values, also have low dielectric constants and are not well suited for low frequency applications.

*Table*

| Composition | Ratio Ba/Pb +Ba | Mol Percent $Nb_2O_5$ | Curie Temp., ° C. | ε′ | $d_{33}$ | $K_p$ | Q | tan δ |
|---|---|---|---|---|---|---|---|---|
| Group I: | | | | | | | | |
| 1 | .102 | 55 | 475 | 548 | 50 | 10 | 21 | .015 |
| 2 | .102 | 59 | ---------- | 298 | 30 | ------- | -------- | .048 |
| Group II: | | | | | | | | |
| 3 | .204 | 55 | 400 | 951 | 40 | 3.4 | 394 | .0113 |
| 4 | .204 | 59 | ---------- | 420 | 28 | ------- | -------- | .016 |
| Group III: | | | | | | | | |
| 5 | .306 | 51 | 300 | 1,410 | 155 | 16 | 240 | .012 |
| 6 | .306 | 55 | 285 | 1,405 | 112 | 14 | 412 | .033 |
| 7 | .306 | 59 | 285 | 1,013 | ------ | 12 | 522 | .002 |
| 8 | .306 | 62.5 | ---------- | 605 | 15 | ------- | -------- | .0175 |
| Group IV: | | | | | | | | |
| 9 | .408 | 50 | 287 | 1,600 | 318 | 42 | 235 | .0022 |
| 10 | .408 | 51 | 172–210 | 2,400 | 400 | 34 | 197 | .008 |
| 11 | .408 | 52 | 200–275 | 2,507 | 155 | 18 | 660 | .0064 |
| 12 | .408 | 53.5 | 200–275 | 1,828 | 90 | 16 | 350 | .0076 |
| 13 | .408 | 55 | 195 | 1,672 | 82 | 14 | 350 | .048 |
| 14 | .408 | 59 | 270 | 749 | 36 | 4 | 750 | .028 |
| 15 | .408 | 62.5 | ---------- | 584 | 15 | 2 | 735 | .0161 |
| Group V: | | | | | | | | |
| 16 | .51 | 55 | 147 | 1,704 | 60 | 8 | 989 | .036 |
| 17 | .51 | 59 | ---------- | 609 | 30 | 7 | 1,460 | .017 |
| 18 | .51 | 62.5 | ---------- | 500 | 10 | ------- | -------- | .016 |
| Group VI: | | | | | | | | |
| 19 | .612 | 51 | 250–345 | 1,190 | 70 | 13 | 1,380 | .020 |
| 20 | .612 | 55 | ---------- | 1,016 | 35 | 3 | 1,530 | .0072 |
| 21 | .612 | 59 | ---------- | 920 | 10 | ------- | -------- | .0080 |
| 22 | .612 | 62.5 | ---------- | 471 | 8 | ------- | -------- | .014 |
| Group VII: | | | | | | | | |
| 23 | .670 | 55 | ---------- | 877 | 25 | 3 | 2,188 | .0076 |
| 24 | .670 | 59 | ---------- | 480 | 18 | ------- | -------- | .010 |
| 25 | .670 | 62.5 | ---------- | 237 | 8 | ------- | -------- | .010 |
| Group VIII: | | | | | | | | |
| 26 | .714 | 55 | ---------- | 925 | 12 | <1 | 461 | .0089 |
| 27 | .714 | 59 | ---------- | 287 | 10 | ------- | -------- | .0175 |

In the foregoing table is presented experimental data for a number of typical lead barium niobate compositions wherein for various atomic ratios of Ba/Pb+Ba content, the mol percent of $Nb_2O_5$ is varied from 50 mol percent to 62.5 mol percent. The properties of the compositions measured are the Curie temperature, dielectric constant ($\epsilon'$), piezoelectric constant ($d_{33}$), electrical loss (tan $\delta$), planar coupling coefficient ($K_p$), and electromechanical Q. The dielectric constant and electrical loss factor were measured at room temperature at a frequency of 1 kilocycle per second. The piezoelectric constant ($d_{33}$) is expressed in coulombs per newton$\times 10^{-12}$. The planar coupling coefficient ($K_p$) is expressed in percent and is a function of that portion of the total input electrical energy that is converted to mechanical energy. The standard resonant-antiresonant technique was used to measure both $K_p$ and Q, the measurements being made at room temperature.

As shown by the table, the Q can be significantly increased by increasing the $Nb_2O_5$ content above 50 mol percent. As previously noted, an increased Q of the lead barium niobate compositions make these compositions extremely useful for band-pass filter compositions. Although increases in Q are seen to be normally accompanied by a decrease in the coupling coefficient, $K_p$ remains sufficiently high so that the factor of merit $K_p^2Q$ is satisfactory for filter applications. The dielectric constant is also increased and piezoelectric constant properties are high, important for filter as well as other applications.

Considering now the compositions of Group I of the table, compositions with a Ba/Pb+Ba content of .102, for 55 mol percent $Nb_2O_5$ there is exhibited a Q of 21. For 59 mol percent $Nb_2O_5$ apparently insufficient energy is coupled for the test equipment employed to provide a measurement of $K_p$ or Q. In Group II, compositions with a barium ratio of .204, 55 mol percent $Nb_2O_5$ provides a Q of 394. No measurement of $K_p$ or Q is obtained at 59 mol percent $Nb_2O_5$. The materials of Groups I and II at 55 mol percent $Nb_2O_5$ exhibit values of Q appreciably higher than found in prior art lead barium niobate ceramics and may be very suitable for high temperature filter applications since high Curie temperatures are possessed.

As the barium content is increased to the ratio of .306 of Group III it may be observed that the magnitude of Q is increased. From an examination of the data for com positions in this group it is also observed that the Q clearly increases with increasing quantities of $Nb_2O_5$, a value of Q of 522 behing exhibited at 59 mol percent. For mol percent of 62.5 the coupling coefficient is again ostensibly too low to provide a measurement of the $K_p$ or Q properties.

Considering Group IV, having a barium ratio of .408, the value of Q is seen to substantially increase for increasing amounts of $Nb_2O_5$, reaching a maximum value of 750 at 59 mol percent $Nb_2O_5$. At 62.5 mol percent $Nb_2O_5$ readings are obtained showing a slight decrease in Q with a lowered coupling coefficient.

In Group V, barium ratio of .51, a Q value of 989 is obtained at 55 mol percent $Nb_2O_5$ and a maximum Q value of 1460 is exhibited at 59 mol percent. At 62.5 mol percent no readings of $K_p$ or Q could be obtained. In Group VI, having a .612 barium ratio, the value of Q is found to increase, it again being clearly evidenced that an increase in Q is obtained by increasing the niobium pentoxide content. A maximum Q of 1530 occurs at 55 mol percent $Nb_2O_5$. No readings of Q or $K_p$ were possible at 59 and 62.5 mol percent. In Group VII, at .67 barium ratio, the highest value of Q has been measured, a value of 2188 at 55 mol percent. The materials of Groups V, VI and VII, being of high Q, may be appreciated to be very useful for narrow band-pass frequency filter applications. Composition 23 is particularly important because of its extremely high Q.

At .714 barium ratio, Group VIII, it is seen that the value of Q falls off substantially, as does the coupling coefficient. The compositions of this group would appear to be the least useful of those tested.

It should be noted that in each of the groups the maximum value of Q exhibited is appreciably higher than was previously obtainable in prior art lead barium niobate compositions. Except for one sample, Q values were not measured for $Nb_2O_5$ contents greater than 59 mol percent presumably because of the limited sensitivity of the test equipment employed or defects in the sample structures due perhaps to the firing cycle not being optimized. However, the table indicates that improved Q values for various Ba/Pb+Ba ratios do exist for $Nb_2O_5$ contents in excess of 62.5 mol percent. In fact, it would be reasonable to expect an improved Q for $Nb_2O_5$ contents as high as 65 mol percent.

The dielectric constants in the various groups have been found to increase and reach a peak value for $Nb_2O_5$ contents above 50 mol percent. This is clearly seen in the compositions of Group IV in which a maximum dielectric constant is exhibited at 52 mol percent $Nb_2O_5$. The piezoelectric constants also are seen to reach maximum values in the composition of Group IV. The electrical loss factors are relatively low for all compositions.

The lead barium niobate ceramic compositions of the present invention are prepared from raw materials composed of lead oxide (PbO), niobium pentoxide ($Nb_2O_5$) and barium carbonate ($BaCO_3$) each of high purity and in relative proportions as to provide a fired product which satisfies the formula $[(PbO)_{1-x}(BaO)_x]_{1-y}[Nb_2O_5]_y$, where $x$ was varied from approximately .1 to .7 and $y$ was varied from .5 to .625.

A suitable method of fabrication of the lead barium niobate compositions is as follows: The raw materials in a powdered form, sufficiently fine to pass through a 200 mesh screen, are prepared for firing by being mixed together in a liquid, such as water, in which the materials are insoluble. Sufficient water is added to form a paste-like mixture. Mixing of the raw materials is performed by a ball milling operation for a period of approximately four hours. Sufficient water is added to maintain the mixture in a paste-like form during ball milling. A suitable binder, such as Hyform 1214, is normally added after three hours to facilitate compacting of the finally fired material. Upon completion of the ball milling, the mixture is dried at a temperature consistent with the type of binder used, 70° C. in the example given. The mixture is then pulverized to pass a 60 mesh screen and compacted into bodies of the desired size and shape under a pressure of approximately 10,000 pounds per square inch. In the process being considered, the bodies were generally in the form of discs about .5 to .85 inch in diameter and about 60 to 125 mils thick.

The compacted bodies are then fired in an oxidizing atmosphere in a kiln. Firing preferably begins at room temperature and progresses at a rise rate of 60° C. per hour to a temperature of approximately 1275° to 1300° C., being soaked at this temperature for about one hour. The furnace is next turned off and the discs are allowed to cool at room temperature. The exact time for firing will vary somewhat as a function of the size and shape of the bodies. The lead oxide is found to react with the niobium pentoxide at a temperature of approximately 550° C., well below its melting temperature of 880° C. Thus, there is little loss of lead due to vaporization. The barium carbonate decomposes at around 1000° C. to form barium oxide which reacts with the previously combined lead niobate to form a dense, vitrified lead barium niobate ceramic.

The ceramic bodies may be polarized and made piezoelectric by submerging them in a silicone oil bath and raising the bath temperature to about 200° to 225° C. An electric field gradient of about 80 volts per mil thickness is applied across the bodies by means of activating electrodes deposited on opposite major faces of the bodies. The silicone oil bath prevents arcing. The temperature and field are maintained at these values for approximately 20 minutes. The bodies are next cooled to a temperature of 40° C. or less with the field maintained throughout the cooling step. The bodies are then removed and washed in heptane. Alternative methods of polarizing the materials well known in the art may also be employed.

Although the inventive compositions are composed principally of lead, barium and niobium, as has been described, additives in small amounts, up to 5 mol percent, have been found to improve the ceramic properties of the compositions. Such additives include $ZrO_2$ and $TiO_2$ which are substituted for a portion of the $Nb_2O_5$. When added in properly selected amounts, they have been found to improve the material density of the material and to control the amount and size of the crystallites developed in the firing process.

It should be recognized that the foregoing examples are intended to be merely illustrative of the principles of the invention and are not to be construed as limiting. Thus, the appended claims are intended to cover the various modifications that may be made which do not depart from the true scope and spirit of the invention.

What we claim as new and desire to secure by Letters Patent of the United States is:

1. A ferroelectric ceramic composition that is the reaction product consisting essentially of lead monoxide, barium oxide and niobium pentoxide in which the atomic ratio of barium to barium plus lead extends from about .1 to about .7 and the niobium pentoxide content extends from a lower value in excess of 50 mol percent to an upper value of about 62.5 mol percent.

2. A ferroelectric ceramic composition that is the reaction product consisting essentially of lead monoxide, barium oxide and niobium pentoxide in which the atomic ratio of barium to barium plus lead extends from about .1 to about .7 and the niobium pentoxide content extends from a lower value in excess of 50 mol percent to an upper value of 59 mol percent.

3. A ferroelectric ceramic composition exhibiting an improved electro-mechanical Q property that is the reaction product consisting essentially of lead monoxide, barium oxide and niobium pentoxide in which the atomic ratio of barium to barium plus lead extends from about .5 to about .7 and the niobium pentoxide content extends from a lower value of about 51 mol percent to an upper value of about 59 mol percent.

4. A ferroelectric ceramic composition exhibiting an improved electro-mechanical Q property that is the reaction product consisting essentially of lead monoxide, barium oxide and niobium pentoxide in which the atomic ratio of barium to barium plus lead is approximately .67 and the niobium pentoxide content is approximately 55 mol percent.

5. A ferroelectric ceramic composition exhibiting an improved Q property and high Curie temperature that is the reaction product consisting essentially of lead monoxide, barium oxide and niobium pentoxide in which the atomic ratio of barium to barium plus lead extends from about .1 to about .2 and the niobium pentoxide content is approximately 55 mol percent.

6. A ferroelectric ceramic composition exhibiting an improved dielectric constant and an improved electro-mechanical Q property that is the reaction product consisting essentially of lead monoxide, barium oxide and niobium pentoxide in which the atomic ratio of barium to barium plus lead is about .4 and the niobium pentoxide content extends from a lower value in excess of 50 mol percent to an upper value of about 59 mol percent.

References Cited by the Examiner

UNITED STATES PATENTS 2,729,757 1/1956 Goodman ---------- 252—62.9
2,805,165 9/1957 Goodman ---------- 252—62.9

FOREIGN PATENTS 881,476 11/1961 Great Britain.

SAMUEL H. BLECH, *Primary Examiner.*

MAURICE A. BRINDISI, *Examiner.*